(12) United States Patent
Kim

(10) Patent No.: US 6,912,027 B2
(45) Date of Patent: Jun. 28, 2005

(54) TRANSFLECTIVE LIQUID CRYSTAL DISPLAY DEVICE AND FABRICATING METHOD THEREOF

(75) Inventor: Dong-Guk Kim, Seoul (KR)

(73) Assignee: Lg. Philips LCD Co., Ltd., Seoul (KR)

(*) Notice: Subject to any disclaimer, the term of this patent is extended or adjusted under 35 U.S.C. 154(b) by 0 days.

(21) Appl. No.: 10/419,810

(22) Filed: Apr. 22, 2003

(65) Prior Publication Data

US 2004/0032552 A1 Feb. 19, 2004

(30) Foreign Application Priority Data

Aug. 14, 2002 (KR) .............................. P10-2002-0047989

(51) Int. Cl.[7] ...................... G02F 1/1335; G02F 1/1333
(52) U.S. Cl. ...................... 349/114; 349/106; 349/138
(58) Field of Search ................................ 349/114, 138, 349/106–109

(56) References Cited

U.S. PATENT DOCUMENTS

| 5,408,345 A | 4/1995 | Mitsui et al. ............... 349/143 |
| 6,195,140 B1 | 2/2001 | Kubo et al. .................. 349/44 |
| 2002/0003596 A1 | 1/2002 | Kim ........................... 549/106 |
| 2003/0076464 A1 * | 4/2003 | Ozawa et al. ............... 349/113 |
| 2003/0218707 A1 * | 11/2003 | Jeong ......................... 349/113 |

FOREIGN PATENT DOCUMENTS

JP 2001-183646 7/2001

* cited by examiner

Primary Examiner—Dung T. Nguyen
(74) Attorney, Agent, or Firm—Morgan Lewis & Bockius LLP

(57) ABSTRACT

A transflective liquid crystal display device and fabricating method thereof is disclosed in the present invention. The transflective liquid crystal display device includes first and second substrates facing into each other, each of the first and second substrates having reflective and transmissive portions, a buffer layer on the first substrate, the buffer layer having a first transmissive hole at the transmissive portion, a color filter layer on the buffer layer and the first substrate, the color filter layer of the transmissive portion being thicker than that of the reflective portion, a common electrode on the color filter layer, a pixel electrode on the second substrate, a reflecting layer over the pixel electrode, the reflecting layer having a second transmissive hole at the transmissive portion, and a liquid crystal layer between the common electrode and the reflecting layer.

27 Claims, 5 Drawing Sheets

TRANSFLECTIVE LIQUID CRYSTAL DISPLAY DEVICE AND FABRICATING METHOD THEREOF

This application claims the benefit of the Korean Application No. P2002-047989 filed on Aug. 14, 2003, which is hereby incorporated by reference.

BACKGROUND OF THE INVENTION

1. Field of the Invention

The present invention relates to a liquid crystal display device, and more particularly, to a transflective liquid crystal display device and fabricating method thereof. Although the present invention is suitable for a wide scope of applications, it is particularly suitable for maximizing brightness and color reproducibility by improving a contrast ratio as well as preventing light leakage without reducing an aperture ratio.

2. Discussion of the Related Art

Liquid crystal display (LCD) devices are developed as next generation display devices because of their characteristics of light weight, thin profile, and low power consumption. Generally, an LCD device is a non-emissive display device that displays images using a refractive index difference having optical anisotropy properties of liquid crystal material that is interposed between a thin film transistor (TFT) array substrate and a color filter (C/F) substrate.

In the conventional LCD device, a displaying method using a backlight behind the array substrate as a light source is commonly used. However, the incident light from the backlight is attenuated during the transmission so that the actual transmittance is only about 7%. The backlight of the conventional LCD device requires high brightness, thereby increasing power consumption by the backlight device. Thus, a relatively heavy battery is required to supply a sufficient power to the backlight of such a device, and the battery cannot be used outdoors for a long period of time.

In order to overcome the problems described above, a reflective LCD has been developed. Since the reflective LCD device uses the ambient light instead of the backlight, it becomes light weight and easy to carry. In addition, power consumption of the reflective LCD device is reduced so that the reflective LCD device can be used for a portable display device such as an electronic diary or a personal digital assistant (PDA).

However, brightness of the reflective LCD device may vary in accordance with the surrounding conditions. For example, the brightness of the indoor ambient light differs largely from that of the outdoors. Therefore, the reflective LCD device cannot be used where the ambient light is weak or does not exist. In order to overcome such problems, a transflective LCD device has been researched and developed. The transflective LCD device can be switched from a transmissive mode using transmission of light to a reflective mode using reflection of light according to the user's selection.

Figure 1:
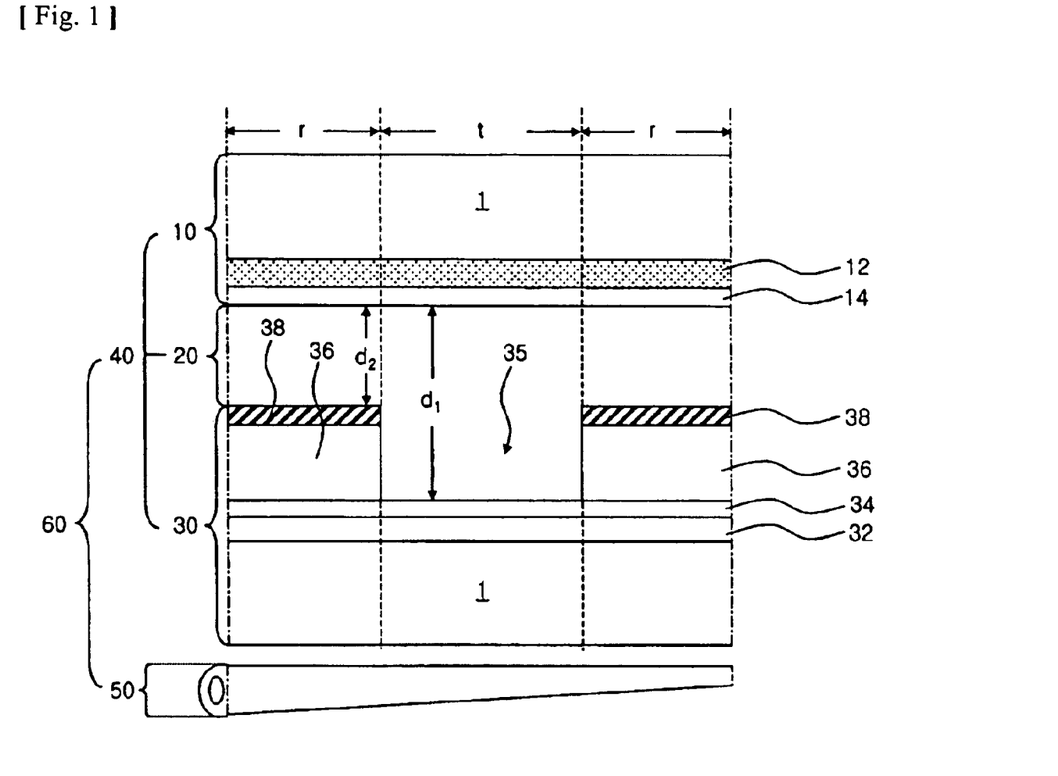
FIG. 1 is a schematic cross-sectional view of a transflective liquid crystal display device according to a related art.

FIG. 1 is a schematic cross-sectional view of a transflective liquid crystal display device according to a related art. As shown in FIG. 1, a liquid crystal panel 40 includes first and second substrates 10 and 30 facing into each other, and a liquid crystal layer 20 interposed therebetween. A transflective liquid crystal display (LCD) device 60 is composed of the liquid crystal panel 40 and a backlight unit 50. The backlight unit 50 is disposed at the outside of the liquid crystal panel 40 and provides the liquid crystal panel 40 with light.

A color filter layer 12 for passing the light having only the specific band of wavelength is formed on the inner surface of the first substrate 10. A common electrode 14 functioning as an electrode applying a voltage to the liquid crystal layer 20 is formed on the color filter layer 12. An insulating layer 32 is formed on the inner surface of the second substrate 30. A transparent pixel electrode 34 functioning as another electrode applying a voltage to the liquid crystal layer 20 is formed on the insulating layer 32. A passivation layer 36 and a reflecting layer 38 that commonly have a transmissive hole 35 exposing a portion of the pixel electrode 34 are subsequently formed on the pixel electrode 34. The liquid crystal panel 40 includes a reflective portion "r" corresponding to the reflecting layer 38 and a transmissive portion "t" corresponding to the transmissive hole 35.

In order to maximize the light efficiency of the reflective and transmissive portions "r" and "t", a cell gap corresponding to a thickness of the liquid crystal layer 20 of the reflective portion "r" is designed to be different from that of the transmissive portion "t". This structure is referred to as a dual cell gap structure. A cell gap "$d_1$" of the transmissive portion "t" is about twice of a cell gap "$d_2$" of the reflective portion "r."

A retardation "δ" of a liquid crystal layer is defined by the following equation:

$$\delta = \Delta n \cdot d,$$

wherein δ represents a retardation of a liquid crystal layer, Δn is a refractive index anisotropy of a liquid crystal layer, and d represents a cell gap of a liquid crystal layer. Therefore, to reduce a difference in light efficiency between the reflective and transmissive modes, the retardation of the liquid crystal layer should be kept uniform by forming a cell gap of the transmissive portion larger than that of the reflective portion.

Figure 2:
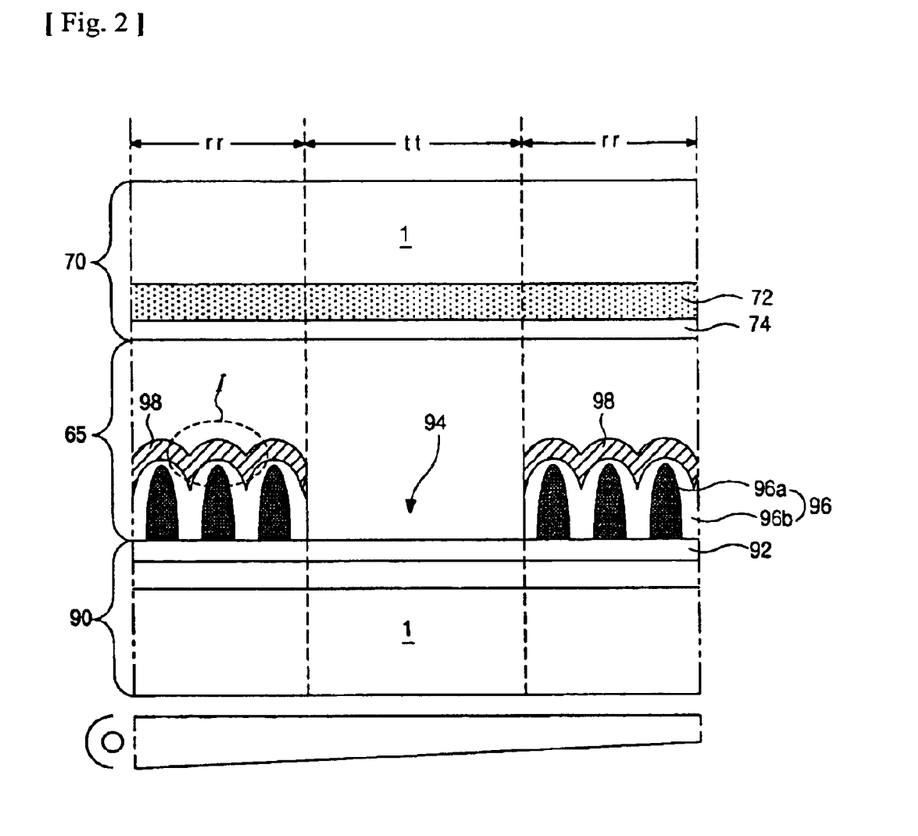
FIG. 2 is a schematic cross-sectional view of a transflective liquid crystal display device having a micro reflector structure (MRS) according to another related art.

FIG. 2 is a schematic cross-sectional view of a transflective liquid crystal display device having a micro reflector structure (MRS) according to another related art. In FIG. 2, first and second substrates 70 and 90 face into and are spaced apart from each other, and a liquid crystal layer 65 is interposed between the first and second substrates 70 and 90. A transparent pixel electrode 92 is formed on the inner surface of the second substrate 90, and a passivation layer 96 having a transmissive hole 94 is formed on the pixel electrode 92. The transmissive hole 94 exposes a portion of the pixel electrode 92. The passivation layer 96 has an uneven pattern "A" on the upper surface. A reflecting layer 98 formed on the passivation layer 96 also has the transmissive hole 94 and the uneven pattern "A". A color filter layer 72 and a common electrode 74 are subsequently formed on the inner surface of the first substrate 70. The reflective LCD device includes a reflective portion "rr" corresponding to the reflecting layer 98 and a transmissive portion "tt" corresponding to the transmissive hole 94.

Since the reflecting layer 98 has the uneven pattern "A" on the upper surface, the incident light is diffusely reflected at the reflecting layer 98 along several directions. Accordingly, the efficiency of the reflected light is improved. This structure of the reflecting layer is referred to as a micro reflector structure (MRS). The passivation layer 96 includes a plurality of seeds 96a having a hemispheric shape and a coating layer 96b covering the seeds 96a. In the MRS, even though the efficiency of reflected light is improved, it is difficult to control a step difference between the reflective and transmissive portions "rr" and "tt" in fabricating processes. This is due to severe variations in processing conditions for the coating layer 96b covering the seeds 96a in accordance with an area ratio of the transmissive portion "tt". Moreover, in a transflective LCD device having a dual cell gap structure, light efficiency between reflective and transmissive portions is kept uniform. However, since a color filter layer has a uniform thickness at the reflective and transmissive portions, light passing through the reflective portion has a high-color reproducibility and a low-brightness as compared to light passing through the transmissive portion due to a difference between the numbers passing through color filters of the reflective and transmissive portions. Accordingly, a color difference between the reflective and transmissive portions occurs.

SUMMARY OF THE INVENTION

Accordingly, the present invention is directed to a transflective liquid crystal display device and fabricating method thereof that substantially obviates one or more of problems due to limitations and disadvantages of the related art.

Another object of the present invention is to provide a transflective liquid crystal display device and fabricating method thereof in which light efficiency and a color characteristic are kept uniform between reflective and transmissive portions.

Another object of the present invention is to provide a transflective liquid crystal display device and fabricating method thereof having a dual thickness color filter (DCF) structure in which a color filter layer of a reflective portion has a thickness different from that of a transmissive portion.

A further object of the present invention is to provide a transflective liquid crystal display device and fabricating method thereof in which a cell gap of a reflective portion is different from that of a transmissive portion by a buffer layer.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective liquid crystal display device includes first and second substrates facing into each other, each of the first and second substrates having reflective and transmissive portions, a buffer layer on the first substrate, the buffer layer having a first transmissive hole at the transmissive portion, a color filter layer on the buffer layer and the first substrate, the color filter layer of the transmissive portion being thicker than that of the reflective portion, a common electrode on the color filter layer, a pixel electrode on the second substrate, a reflecting layer over the pixel electrode, the reflecting layer having a second transmissive hole at the transmissive portion, and a liquid crystal layer between the common electrode and the reflecting layer.

In another aspect of the present invention, a fabricating method of a transflective liquid crystal display device includes forming a buffer layer on a first substrate having reflective and transmissive portions, the buffer layer having a first transmissive hole at the transmissive portion, forming a color filter layer on the buffer layer and the first substrate, the color filter layer of the transmissive portion being thicker than that of the reflective portion, forming a common electrode on the color filter layer, forming a pixel electrode on a second substrate having the reflective and transmissive portions, forming a reflecting layer over the pixel electrode, the reflecting layer having a second transmissive hole at the transmissive portion, attaching the first and second substrates such that the common electrode and the reflecting layer face into each other, and forming a liquid crystal layer between the common electrode and the reflecting layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 3:
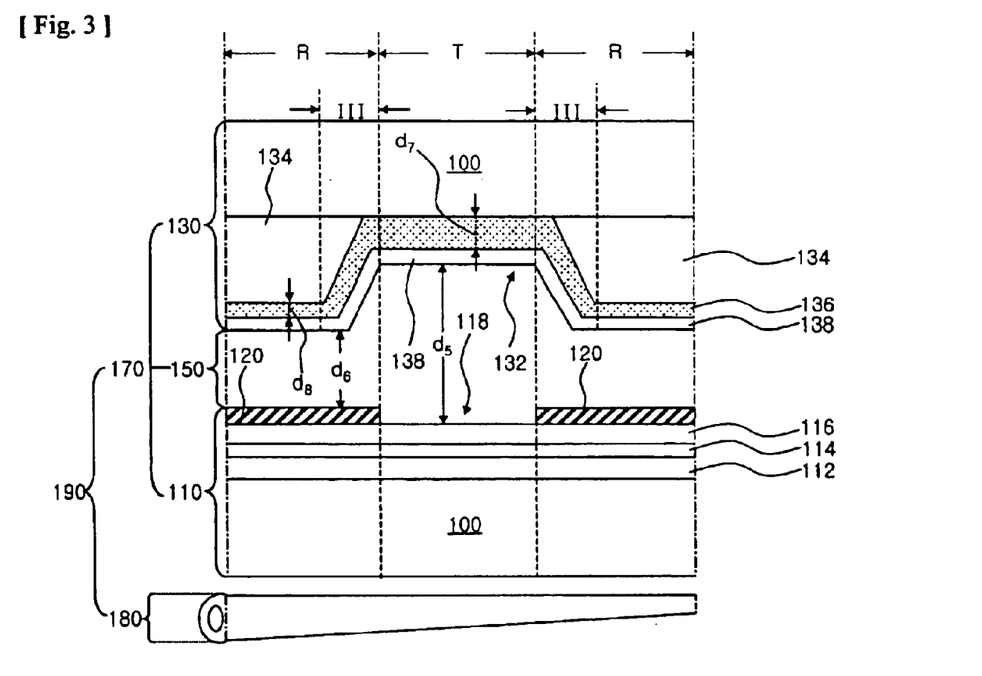
FIG. 3 is a schematic cross-sectional view of a transflective liquid crystal display device according to a first embodiment of the present invention.

FIG. 3 is a schematic cross-sectional view of a transflective liquid crystal display device according to a first embodiment of the present invention.

In FIG. 3, first and second substrates 110 and 130 face into and are spaced apart from each other. A liquid crystal panel 170 includes the first and second substrates 110 and 130, and a liquid crystal layer 150 interposed therebetween. A transflective liquid crystal display (LCD) device 190 is composed of the liquid crystal panel 170 and a backlight unit 180. The backlight unit 180 is disposed at the outside of the liquid crystal panel 170 and provides the liquid crystal panel 170 with light.

The transflective LCD device 190 includes reflective and transmissive portions "R" and "T". A buffer layer 134 is formed on the inner surface of the first substrate 110. The buffer layer 134 has a first transmissive hole 132 at the transmissive portion "T". Thus, the liquid crystal layer 150 of the transmissive portion "T" is greater than that of the reflective portion "R" (i.e., a cell gap of the reflective portion "R"). A color filter layer 136 is formed on the buffer layer 134 and the inner surface of the first substrate 110. The color filter layer 136 of the transmissive portion "T" is thicker than that of the reflective portion "R". Accordingly, the color filter layer 136 has a step difference along the boundary of the first transmissive hole 132. A common electrode 138 is formed on the color filter layer 136.

An insulating layer 112 is formed on the inner surface of the second substrate 130, and a reflecting layer 120 is formed on the insulating layer 112. A passivation layer 116 of a transparent insulating material is formed on the reflecting layer 120 including the insulating layer 112. A transparent pixel electrode 114 is formed on the passivation layer 116. The reflecting layer 120 has a second transmissive hole 118 at the transmissive portion "T" exposing a portion of the insulating layer 112. The reflecting layer 120 and the second transmissive hole 118 correspond to the reflective and transmissive portions "R" and "T", respectively, in a liquid crystal display region 170.

The color filter layer 136 can be divided into first, second, and third regions "I", "II", and "III": the first region "I" is a first flat portion on the buffer layer 134, the second region "II" is a second flat portion on the inner surface of the first substrate 110, and the third region "III" is a first inclined portion between the first and second regions. The first and third regions "I" and "III" correspond to the reflecting layer 120, and the second region "II" corresponds to the second transmissive hole 118. A black matrix (not shown) may be disposed at a portion corresponding to the border of the color filter layer 136.

A defect in a rubbing process for an alignment layer (not shown) easily occurs at the third region "III" due to the step difference, and the defect causes a "disclination" in the third region "III". The "disclination" causes light leakage when a black image is displayed, and a contrast ratio is reduced much more in the transmissive portion "T" than in the reflective portion "R". When a black matrix is disposed to shield the third region "III" in order to prevent the reduction of the contrast ratio, an aperture ratio is severely reduced. Accordingly, in order to prevent the light leakage without reduction of the aperture ratio, the third portion "III" is disposed to correspond to the reflecting layer 120 of the first substrate 110 so that the light from the backlight unit 180 cannot penetrate the third region "III", when forming the buffer layer 134 and the color filter layer 136.

The buffer layer 134 may be formed of one of a transparent organic material and a transparent inorganic material. When the color filter layer 136 is formed by coating color resin, the color filter layer 136 is formed to be thicker in the transmissive portion "T" than in the reflective portion "R". That is, a first thickness "$d_7$" of the color filter layer 136 of the transmissive portion "T" is greater than a second thickness "$d_8$" of the color filter layer 136 of the reflective portion "R" because of the first transmissive hole 132. However, since the thickness of the buffer layer 134 is greater than a difference between the first and second thicknesses "$d_7$" and "$d_8$", a first cell gap "$d_5$" defined by a thickness of the liquid crystal layer 150 of the transmissive portion "T" is greater than a second cell gap "$d_6$" defined by a thickness of the liquid crystal layer 150 of the reflective portion "R".

A difference between the first and second cell gaps "$d_5$" and "$d_6$", and color reproducibility of the reflective and transmissive portions "R" and "T" can be controlled by a thickness of the buffer layer 134, a type of the color resin and a coating condition of the color resin. For example, a step difference of the color filter layer 136 between the reflective and transmissive portions "R" and "T" of about 2.0 μm to about 2.5 μm can be obtained by forming the buffer layer 134 of a thickness of about 2.0 μm to about 5.0 μm.

Therefore, the transflective LCD device 190 has the following advantages. A color difference between the reflective and transmissive portions "R" and "T" is reduced by forming the color filter layer 136 of the transmissive portion "T" thicker than that of the reflective layer "R". Also, light efficiency is kept uniform between the reflective and transmissive portions "R" and "T" by forming the first cell gap "$d_5$" of the transmissive portion "T" greater than the second cell gap "$d_6$" of the reflective portion "R". Finally, a contrast ratio of the transmissive portion "T" is improved by disposing the inclined portion "III" of the color filter layer 136 to correspond to the reflecting layer 120. Also, the color filter layer of the reflective portion and the color filter layer of the transmissive portion has a relative thickness ratio of about 1:1.5 to 1:2.5.

Although not shown in FIG. 3, the pixel electrode 114 and the reflecting layer 120 are formed at each sub-pixel, which is a unit for displaying images. A voltage is applied to the pixel electrode 114 through a switching element (not shown). The reflecting layer 120 functions either as an electrode to which a voltage is applied or as a reflection plate without applying a voltage. Also, the reflecting layer 120 may be formed over the pixel electrode 114.

Figure 4:
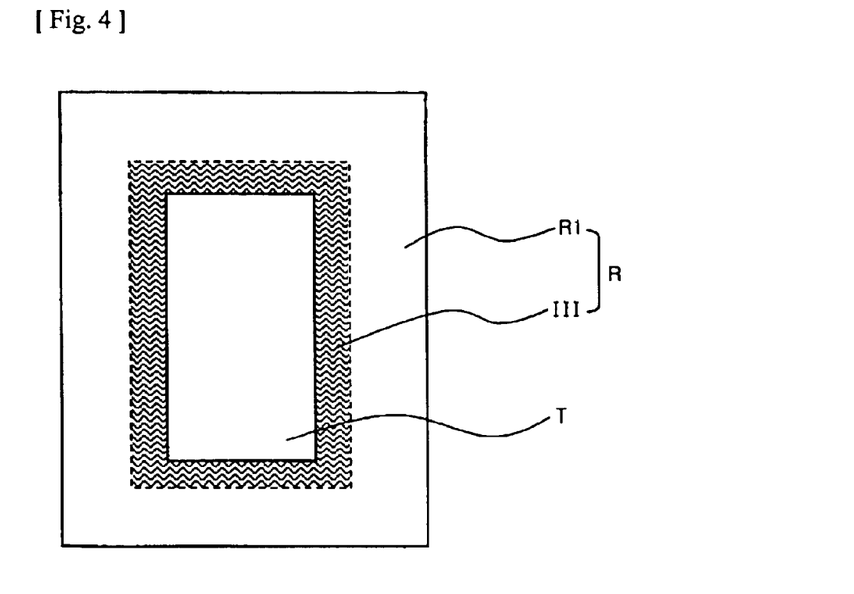
FIG. 4 is a schematic plane view of the transflective liquid crystal display device according to the first embodiment of the present invention.

FIG. 4 is a schematic plane view of the transflective liquid crystal display device according to the first embodiment of the present invention.

In FIG. 4, a transflective LCD device includes a transmissive portion "T" and a reflective portion "R" surrounding the transmissive portion "T". The reflective portion "R" is divided into a first flat portion "I" and an inclined portion "III" of a first substrate (not shown). The transmissive portion "T" is a second flat portion "II". Since the reflective portion "R" includes the inclined portion "III", a reduction in a contrast ratio due to light leakage at the inclined portion "III" is prevented.

Figure 5:
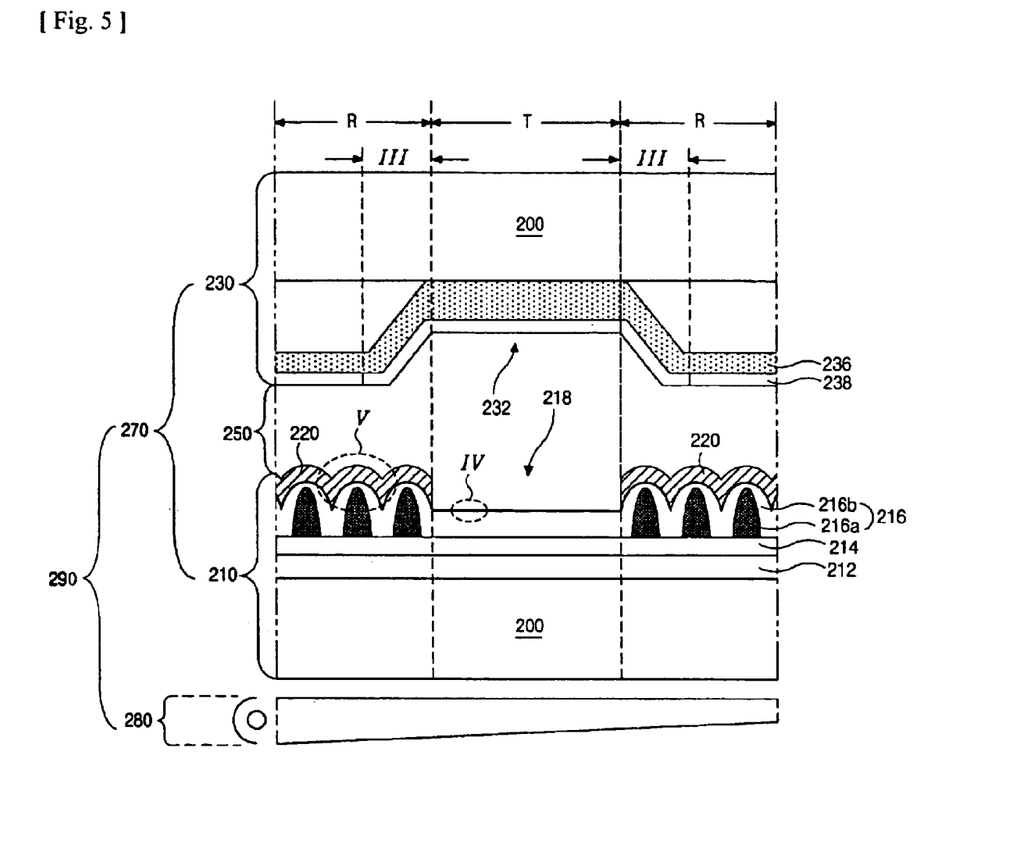
FIG. 5 is a schematic cross-sectional view of a transflective liquid crystal display device according to a second embodiment of the present invention.

FIG. 5 is a schematic cross-sectional view of a transflective liquid crystal display device according to a second embodiment of the present invention.

In FIG. 5, first and second substrates 210 and 230 face into and are spaced apart from each other. A liquid crystal panel 270 includes the first and second substrates 210 and 230, and a liquid crystal layer 250 interposed therebetween. A transflective liquid crystal display (LCD) device 290 is composed of the liquid crystal panel 270 and a backlight unit 280. The backlight unit 280 is disposed at the outside of the liquid crystal panel 270 and provides the liquid crystal panel 270 with light.

The transflective LCD device 290 includes reflective and transmissive portions "R" and "T". A buffer layer 234 is formed on the inner surface of the first substrate 210. The buffer layer 234 has a first transmissive hole 232 corresponding to the transmissive portion "T". Thus, the liquid crystal layer 250 of the transmissive portion is thicker than that of the reflective portion "R", (i.e., a cell gap of the reflective portion "R"). A color filter layer 236 is formed on the buffer layer 234 and the inner surface of the first substrate 210. The color filter layer 236 of the transmissive portion "T" is thicker than that of the reflective portion "R". Accordingly, the color filter layer 236 has a step difference along the boundary of the first transmissive hole 232. A common electrode 238 is formed on the color filter layer 236.

A first insulating layer 212 is formed on the inner surface of the second substrate 230. A passivation layer 216 including first and second sub-passivation layers 216a and 216b is formed on the first insulating layer 212. A reflecting layer 220 is formed on the passivation layer 216. A second insulating layer 219 is formed on the reflecting layer 220. A transparent pixel electrode 214 is then formed on the reflecting layer 220.

The first sub-passivation layer 216a is a seed for an uneven surface of the passivation layer 216. The second sub-passivation layer 216b covers the entire surface of the second substrate 230 including the first sub-passivation layer 216a. Accordingly, the passivation layer 216 is divided into a flat region "IV" and an uneven region "V". A reflecting layer 220 is formed on the passivation layer 216. The reflecting layer 220 has a second transmissive hole 218 at the transmissive portion "T" exposing a portion of the passivation layer 216 of the flat region "IV". The reflecting layer 220 and the second transmissive hole 218 correspond to the reflective and transmissive portions "R" and "T", respectively.

In forming the uneven region "V" of the upper surface of the passivation layer 216 to improve the efficiency of the reflected light, an additional step structure of the passivation layer 216 between the reflective and transmissive portions "R" and "T" is not used. Accordingly, a processing condition for the first and second sub-passivation layers 216a and 216b is simplified, and characteristics of the passivation layer 216 in the uneven region "V" are improved.

Figure 6:
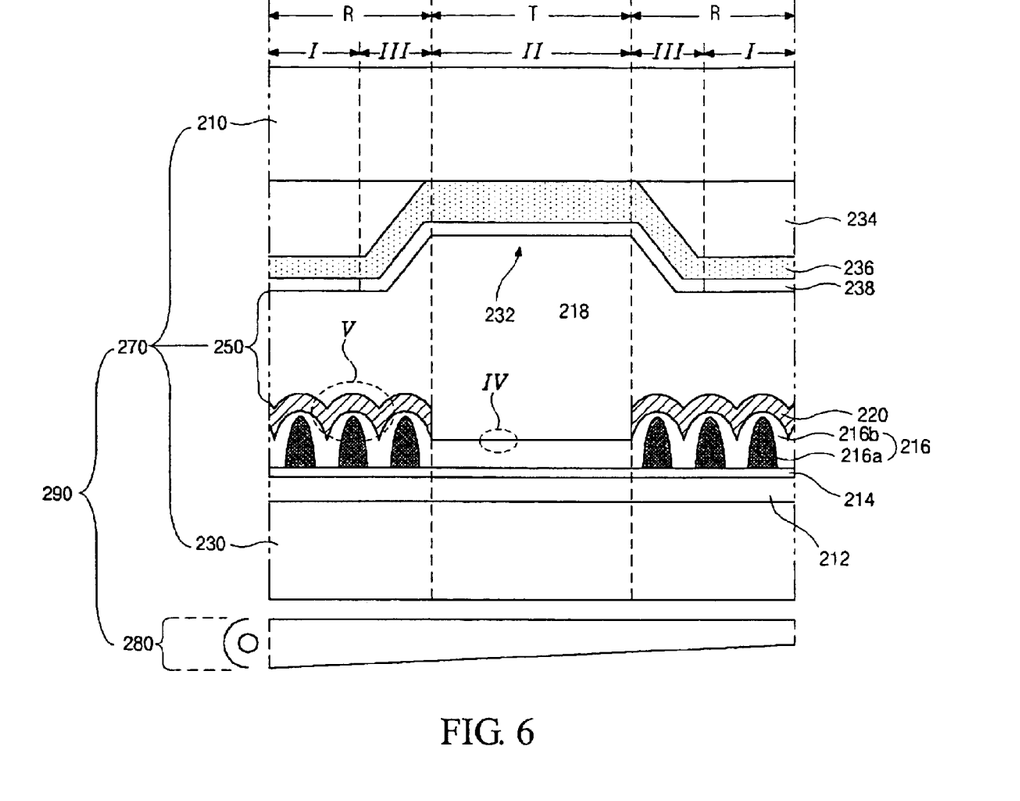
FIG. 6 is a schematic cross-sectional view of a transflective liquid crystal display device according to a third embodiment of the present invention.

In another method of forming an uneven surface of the passivation layer 216, the uneven surface of the passivation layer can be obtained through a photolithographic process without a seed. After the passivation layer 216 of a photosensitive material is formed thereon, the passivation layer 216 is selectively exposed with a light source. Also, FIG. 6 is a schematic cross-sectional view of a transflective liquid crystal display device according to a third embodiment of the present invention in which the reflecting layer 220 may be formed over the pixel electrode 214.

TABLE 1 is experimental data showing various thickness of a color filter layer and a buffer layer, and a step of a color filter layer between reflective and transmissive portions.

TABLE 1

| | 1 sub-pixel | | | |
|---|---|---|---|---|
| | color filter of reflective portion | color filter of transmissive portion | buffer layer | cosθ × oblique side of color filter layer between reflective and transmissive portions (where θ is an angle of a surface step) |
| NTSC 15% | 0.65 μm | 1.30 μm | 3 μm | 2.2 μm |
| NTSC 20% | 0.88 μm | 1.57 μm | 3 μm | 2.2 μm |

In TABLE 1, one sub-pixel of a 10.4" super video graphics adapter (SVGA) transflective LCD device is measured when an area ratio of each of the reflective and transmissive portions "R" and "T" (shown in FIG. 5) is about 6:4. A color reproducibility of each of the reflective and transmissive portions "R" and "T" (shown in FIG. 5) is about 15% or 20% using a color coordinate of the national television system committee (NTSC). When the buffer layer 234 (shown in FIG. 5) has a thickness of about 3 μm, a thickness ratio of the color filter layer 236 (shown in FIG. 5) between the reflective and transmissive portions "T" and "R" (shown in FIG. 5) is about 1:2. A step difference of the color filter layer 236 (shown in FIG. 5) between the reflective and transmissive portions "T" and "R" (shown in FIG. 5) is about 2.2 μm. Accordingly, a uniform color property of the color filter layer 236 (shown in FIG. 5) in the reflective and transmissive portions "T" and "R" (shown in FIG. 5) and a uniform light efficiency in the reflective and transmissive portions "T" and "R" (shown in FIG. 5) are simultaneously obtained by forming the buffer layer 234 (shown in FIG. 5) thicker than a cell gap of the reflective portion "R" (shown in FIG. 5).

In the liquid crystal display device in the present invention can be operated under one of an ECB mode and a VA mode.

A transflective liquid crystal display device in the present invention has the following advantages. Since a color filter layer is easily formed to have desired thickness in reflective and transmissive portions, a color reproducibility is kept uniform in the reflective and transmissive portions. Also, since an additional step structure of an array substrate for a dual cell gap is not required, a short circuit between the electrodes can be prevented, and a micro reflector structure (MRS) improving reflection efficiency can easily be formed. Furthermore, since an inclined portion of the color filter layer is disposed to correspond to a reflecting layer of the array substrate, light leakage is prevented and a contrast ratio of a transmissive portion is improved without reducing an aperture ratio.

It will be apparent to those skilled in the art that various modifications and variations can be made in the transflective liquid crystal display device and fabricating method thereof of the present invention without departing from the spirit or scope of the inventions. Thus, it is intended that the present invention covers the modifications and variations of this invention provided they come within the scope of the appended claims and their equivalents.

What is claimed is:

1. A transflective liquid crystal display device, comprising:
    first and second substrates facing into each other, each of the first and second substrates having reflective and transmissive portions;
    a buffer layer on the first substrate, the buffer layer having a first transmissive hole at the transmissive portion;
    a color filter layer on the buffer layer and the first substrate, wherein a total thickness of the color filter layer and the buffer layer of the reflective portion is thicker than a thickness of the color filter layer of the transmissive portion;
    a common electrode on the color filter layer;
    a pixel electrode at the reflective and transmissive portions;
    a reflecting layer at the reflective portion, the reflecting layer having a second transmissive hole at the transmissive portion; and
    a liquid crystal layer between the common electrode and the pixel electrode, wherein the buffer layer at the reflective portion is thicker than a thickness difference between the liquid crystal layer at the transmissive portion and the liquid crystal layer at the reflective portion.

2. The device according to claim 1, wherein the color filter layer comprises a first region having a first flat portion on the buffer layer, a second region having a second flat portion on the first substrate, and a third region having a first inclined portion between the first and second regions.

3. The device according to claim 2, wherein the first and third regions are located at the reflective portion, and the second region is located at the transmissive portion.

4. The device according to claim 2, wherein a step difference of the color filter layer between the first and second regions is about 2.0 μm to about 3.0 μm.

5. The device according to claim 1, wherein the buffer layer has an inclined portion at a boundary of the first transmissive hole.

6. The device according to claim 1, wherein the liquid crystal layer of the transmissive portion is thicker than that of the reflective portion.

7. The device according to claim 6, wherein the liquid crystal layer of the transmissive portion is about twice as thick as that of the reflective portion.

8. The device according to claim 1, wherein the buffer layer is formed of one of a transparent inorganic insulating material and a transparent organic insulating material.

9. The device according to claim 1, wherein the buffer layer has a thickness of about 2.0 μm to about 5.0 μm.

10. The device according to claim 1, further comprising a first insulating layer between the second substrate and the reflecting layer and a second insulating layer between the pixel electrode and the reflecting layer.

11. The device according to claim 10, wherein the first insulating layer has an uneven surface at the reflective portion.

12. The device according to claim 11, wherein the first insulating layer has a flat surface at the transmissive portion.

13. The device according to claim 12, wherein the reflecting layer has an uneven surface at the reflective portion.

14. The device according to claim 1, wherein the common electrode and the pixel electrode are formed of a transparent conductive material.

15. The device according to claim 1, wherein the color filter layer of the reflective portion and the color filter layer of the transmissive portion has a relative thickness ratio of about 1:1.5 to 1:2.5.

16. The device according to claim 1, wherein the reflecting layer is formed over the pixel electrode.

17. The device according to claim 1, wherein the liquid crystal display device is operated under one of an ECB mode and a VA mode.

18. A fabricating method of a transflective liquid crystal display device having first and second substrates, comprising:

forming a buffer layer on the first substrate, the buffer layer having a first transmissive hole at the transmissive portion, each of the first and second substrates having reflective and transmissive portions;

forming a color filter layer on the buffer layer and the first substrate, wherein a total thickness of the color filter layer and the buffer layer of the reflective portion is thicker than a thickness of the color filter layer of the transmissive portion;

forming a common electrode on the color filter layer;

forming a pixel electrode at the reflective and transmissive portions;

forming a reflecting layer at the reflective portion, the reflecting layer having a second transmissive hole at the transmissive portion; and forming a liquid crystal layer between the common electrode and the pixel electrode, wherein the buffer layer at the reflective portion is thicker than a thickness difference between the liquid crystal layer at the transmissive portion and the liquid crystal layer at the reflective portion.

19. The method according to claim 18, wherein the color filter layer comprises a first region having a first flat portion on the buffer layer, a second region having a second flat portion on the first substrate, and a third region having a first inclined portion between the first and second regions.

20. The method according to claim 18, wherein the buffer layer has a thickness of about 2.0 μm to about 5.0 μm.

21. The method according to claim 18, further comprising forming a first insulating layer between the second substrate and the reflecting layer and a second insulating layer between the pixel electrode and the reflecting layer.

22. The method according to claim 21, wherein the first insulating layer has an uneven surface at the reflective portion.

23. The method according to claim 21, wherein the first insulating layer has a flat surface at the transmissive portion.

24. The method according to claim 21, wherein the reflecting layer has an uneven surface at the reflective portion.

25. The method according to claim 18, wherein a thickness ratio of the color filter layer of the reflective portion and the color filter layer of the transmissive portion is about 1:1.5 to 1:2.5.

26. The method according to claim 18, wherein the reflecting layer is formed over the pixel electrode.

27. The method according to claim 18, wherein the liquid crystal display device is operated under one of an ECB mode and a VA mode.

* * * * *